United States Patent
Kleitz et al.

[11] 3,963,597
[45] June 15, 1976

[54] ELECTRICALLY REGENERATIVE OXYGEN TRAP

[75] Inventors: Michel Kleitz; Pierre Fabry, both of Grenoble; Jacques Fouletier, St. Martin d'Heres, all of France

[73] Assignee: Agence Nationale de Valorisation de la Recherche (ANVAR), Neuilly-sur-Seine, France

[22] Filed: Mar. 25, 1974

[21] Appl. No.: 454,705

[30] Foreign Application Priority Data
Mar. 30, 1973  France .............................. 73.11572

[52] U.S. Cl. ............................... 204/277; 204/278; 204/193; 204/194; 252/181.1
[51] Int. Cl.² ...................... C25B 9/00; H01J 7/18
[58] Field of Search ................ 204/195 S, 129, 193, 204/277, 278, 193–194; 136/86 F; 55/2, 12; 252/181.1; 316/25

[56] References Cited
UNITED STATES PATENTS
3,400,054  9/1968  Ruka et al. ..................... 204/195 S

*Primary Examiner*—R. L. Andrews
*Attorney, Agent, or Firm*—Larson, Taylor and Hinds

[57] ABSTRACT

A regenerative oxygen trap which uses an oxygen absorbing material formed of a solid solution of metal oxides having both an ionic conductivity through $O^{2-}$ ions and a nonzero electrical conductivity, the material forming part of a circuit which also includes a source of electricity. The material is converted in an inert gas to its reduced form by the passage of a current therethrough, in which form it is effective for the absorption of gaseous oxygen.

30 Claims, 2 Drawing Figures

ELECTRICALLY REGENERATIVE OXYGEN TRAP

BACKGROUND OF THE INVENTION

The invention relates to a regenerative oxygen trap.

The necessity of being able to use certain gases having all traces of oxygen removed during chemical reactions has led to the manufacture of numerous traps of either the regenerating or non-regenerating type which are made mostly from metals or metal oxides selected subject to their chemical affinity for oxygen. However, the operation of this apparatus has many disadvantages which result partly from the reaction techniques brought into play or which are inherent in the chemical properties of the elements under consideration.

Metals currently in use include firstly titanium and zirconium which constitute excellent traps on account of their great affinity for oxygen, but which, when used in their original state, have the important disadvantage thay they rapidly lose their effectiveness. An oxide layer forms on the surface which hinders the fixation of oxygen without it being possible to detect easily the appearance of such superficial saturation.

Liquid magnesium is also a very effective oxygen trap, but has the disadvantage of introducing magnesium oxide into the purified gases.

Copper can also be used as a material for collecting oxygen. The traps which are provided with copper have the advantage of being regenerative through the action of hydrogen passing over the formed copper oxide. This system is not suitable for all applications as traces of hydrogen are still occluded in the copper after regeneration. These traces of hydrogen are subsequently found in the form of water vapour in the gas which is to be purified.

The object of the invention is to overcome the various aforementioned disadvantages and provide an oxygen trap whose effectiveness is ensured by a reaction for the rapid elimination of oxygen, the rate of which is substantially constant throughout the entire operation of the trap and can be easily controlled.

SUMMARY OF THE INVENTION

The oxygen trap according to the invention, which comprises a closed enclosure or enclave, means of admitting into this enclave a gas containing traces of oxygen to be eliminated and means for evacuating the purified gas from this enclave, is characterised in that it comprises, inside this enclave, a mass, preferably a block of material formed of a solid solution of metal oxides which imparts thereto an ionic conductivity through $O^{2-}$ ions and a nonzero electrical conductivity, this mass being introduced into an electric circuit comprising a source of electricity such as a direct or rectified current generator.

If necessary, a furnace is associated with the trap as defined above in a case where the block must be raised to a sufficiently high temperature for the respectively aforementioned ionic and electrical conductivities to be manifested to any appreciable degree.

The aforementioned solid solutions are preferably formed of a "base oxide" having a valence number 4, such as zirconium dioxide $ZrO_2$, thorium dioxide $ThO_2$, or hafnium dioxide $HfO_2$, and a "solute" formed of at least one oxide of a metal with a lower valency, such a syttrium oxide $Y_2O_3$, calcium oxide $CaO$, magnesium oxide $MgO$, or rare earths, such as oxides, for example, $La_2O_3$, $Yb_2O_3$, $Sc_2O_3$ etc. The dissolving of the oxide with the lower valency in the oxide with the valence number 4 leads to the formation of a lattice having oxygen vacancies or unoccupied sites which impart to these solid solutions the property of conducting electric current in the form of $O^{2-}$ oxide ions.

In addition the said solid solutions must contain an oxide or "electronic dope additive" which imparts thereto properties of electric conduction. This function is sometimes fulfilled by the base oxide and sometimes by the solute. Alternatively a metal oxide can be advantageously used, such as cerium oxide $CeO_2$ or one of several oxides of the transition metals. It will be noted that the oxide $CeO_2$ can also act as the base oxide, at least in those oxygen traps which are intended for relatively limited purification, in particular a degree of purification not exceeding that which would result in the purified gas having a partial oxygen pressure of less than $10^{-7}$ atmospheres. It is found that attempts to produce further purification result in the cerium metal tending to adopt the valence number 3, the resulting oxide therefore becoming a purely electric conductor.

Preferably the weight concentration of the solid in relation to the entire solid solution will be of the order of 5 to 20%, at least when the conditions for reciprocal miscibility of the selected oxides permit. The weight concentration of the "electronic dope additive" will possibly be lower, for example, 0.1 to 5% in the case of $CeO_2$ or the oxides of transition metals.

A preferred base oxide is formed by zirconium dioxide, the obtained solid solutions having ionic conductivities which are already appreciable at temperatures of the order of 600°C.

Typical solid solutions of the invention, which to a great extent possess the properties of ionic and electrical conductivity respectively, are formed of $ZrO_2$, $Y_2O_3$ and $CeO_2$ obtained in percentages by weight of, respectively, 86%, 10% and 4%, or even 90%, 9% and 1%. These solid solutions can be represented by the following respective formula:

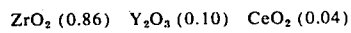

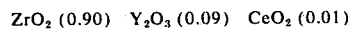

The solid solutions according to the invention are capable of conducting an electric current when introduced into an electric circuit, this conduction being accompanied by the conversion of this solid solution into its "reduced form", with oxygen in its gaseous form being eliminated. In the case of the typical compounds indicated above, this conversion can be observed for potential differences ranging from several volts to several dozen volts. The solid solutions in their reduced form have considerable affinity for oxygen as soon as the flow of electric current is interrupted. A hundred grams of such a solid solution can "trap" approximately 1 liter of oxygen. This affinity imparts to these solid solutions in the reduced form a capacity for eliminating oxygen which permits rates of purification giving rise to partial oxygen pressures of less than $10^{-20}$ and even $10^{-30}$ atmospheres. The affinity of these solid solutions proves to be almost the same as that of titanium, that is to say, much higher than that of the copper-based alloys. It is such that even the traces of water vapour and carbon monoxide are reduced to the state of hydrogen and carbon.

A particularly interesting additional property of the solid solutions based on zirconium dioxide resides in the fact that the reduced form of the solid solution is black, the solid electrolyte not returning to its white form until it is completely oxidized again. This change in colour consequently permits easy checking and control of the adsorption properties of the material in relation to the oxygen.

Another particularly interesting property which can be used to determine the saturation point of the trap concerns the electrical conductivity of the utilizable materials. The conductivities of the reduced forms are always much higher than those of corresponding oxidized forms. The conductivities undergo a sudden variation at saturation point. As an example for the solid solution comprising $(ZrO_2)$ 0.87, $(Y_2O_3)$ 0.12, $(CeO_2)$ 0.01, the ratio between the conductivities of the reduced and oxidized forms is always greater than 10 within the temperature range 600°–900°C.

In accordance with another advantageous feature of the invention, the said block is porous. It is simple to produce such a porous block by calcinating or roasting a powder of the selected preformed solid solution. The porosity considerably promotes exchanges between the gaseous phases containing traces of oxygen and the solid solution.

BRIEF DESCRIPTION OF THE DRAWINGS

Other features of the invention will become apparent in the course of the following description of preferred embodiments of traps according to the invention, in connection with the drawings in which.

DESCRIPTION OF PREFERRED EMBODIMENTS

Figure 1:
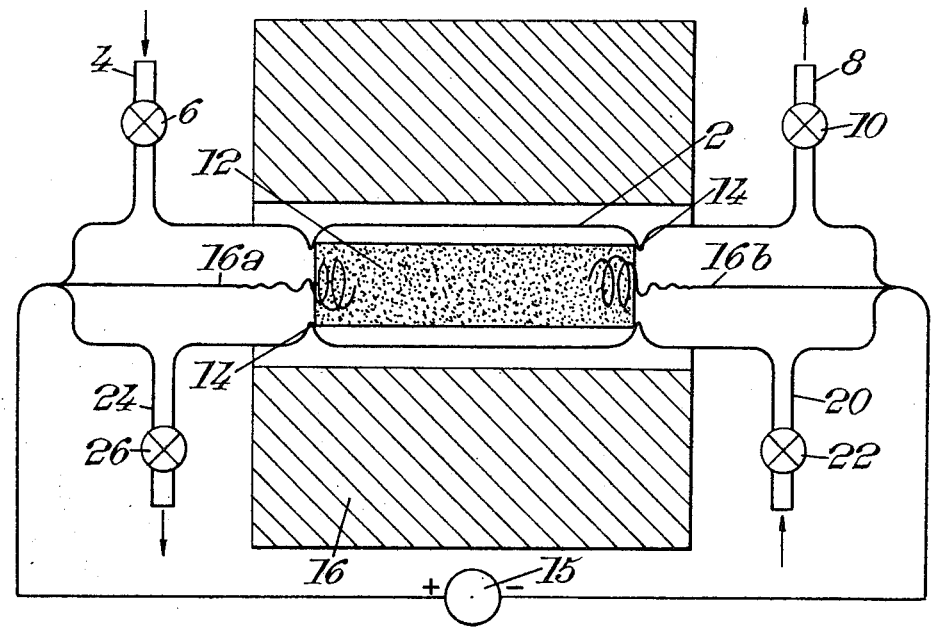
FIG. 1 is a diagrammatic view showing an oxygen trap capable of discontinuous or intermittent operation.

FIG. 1 shows an experimental type of oxygen trap comprising an enclave 2, means of admitting gas to be purified comprising a connection 4 controlled by a shutter or valve 6, and means of evacuating this gas from the enclave, comprising a connection 8 controlled by a valve 10, and, inside the enclave 2, a porous block 12 formed of a solid solution such as that defined above, the gas admitted through the connection 4 being unable to be evacuated by the connection 8 until it passes through the porous block 12.

In the illustrated embodiment the enclave 2 and the block 12 are both generally cylindrical in shape, the block being maintained in position in this enclave, for example, by means of constricted zones 14 formed therein.

The block 12 is inserted in an electric circuit comprising a direct or rectified current generator 15 whose terminals are electrically connected to opposite ends of the block, for example, by means of metal conductors 16a, 16b which are simply brought into contact with the solid electrolyte. In the experimental enclave shown in FIG. 1 they are embedded in the ends of the block 12, having been secured particularly by being sintered together with this block during the formation of the latter.

A furnace 16 encloses the enclave 2, at least that part in which the block 12 is located, this furnace being suitable for bringing the solid solution to the temperature at which it exhibits appreciable degrees of ionic and electrical conductivities, for example from 600° to 800°C, when the block is formed of the solid solution containing the oxides of, respectively, zirconium, yttrium and cerium, particularly in the proportions indicated above.

The apparatus shown in FIG. 1 also comprises means, particularly a connection 20 and a valve 22 for admitting an inert gas into the enclave, as well as means of evacuating this gas, comprising particularly a connection 24 and a valve 26, these latter admitting and evacuating means being preferably arranged in such a manner that the introduced gas is caused to circulate in the opposite direction to that normally followed by the gas to be purified at an earlier stage.

The apparatus so arranged operates therefore in the following manner. During the first stage the solid solution of the block 12 is converted into its reduced form, particularly by passing an electric current through the block, the direction of the current resulting from the indication of positive and negative polarities respectively associated with the conductors 16a, 16b. During this operation the valves 6 and 10 are closed while the valves 22 and 26 are open and permit the passage through the porous block of an inert gas, such as nitrogen or a neutral gas, which draws off the oxygen liberated by the process of electrochemical reduction. When the solid solution is that indicated above by way of example, this reduction process is accompanied by a blackening of the porous mass. At the end of this process the current to the electric circuit is interrupted. The oxygen trap is therefore ready for operation, particularly in the following conditions.

The valves 22 and 26 are closed, and the valves 6 and 10 are open, the latter therefore allowing the gas for purification to be admitted into the enclave via the connection 4, brought into contact with the porous block 12 and evacuated by way of the connection 10. The traces of oxygen contained in the gas to be purified are therefore drastically reduced by the solid solution of the block 12. Observation of the colouring of the latter makes it possible to determine the precise moment when its capacity for adsorption is exhausted since it will not return to its white colour until it is completely oxidized again.

The variation in the conduction or electrical resistance of the trap can be used to be same end, as indicated above.

It will also be observed that adsorption of the oxygen is rapid irrespective of the degree of oxidation of the solid solution, and in particular that the rate of adsorption of the oxygen is not appreciably affected by this degree of oxidation as long as the latter is lower than the value which it exhibits in natural solid solutions.

When this degree of maximum oxidation is reached, the solid solution is regenerated by being converted into its reduced state, in the conditions which have been indicated above.

Figure 2:
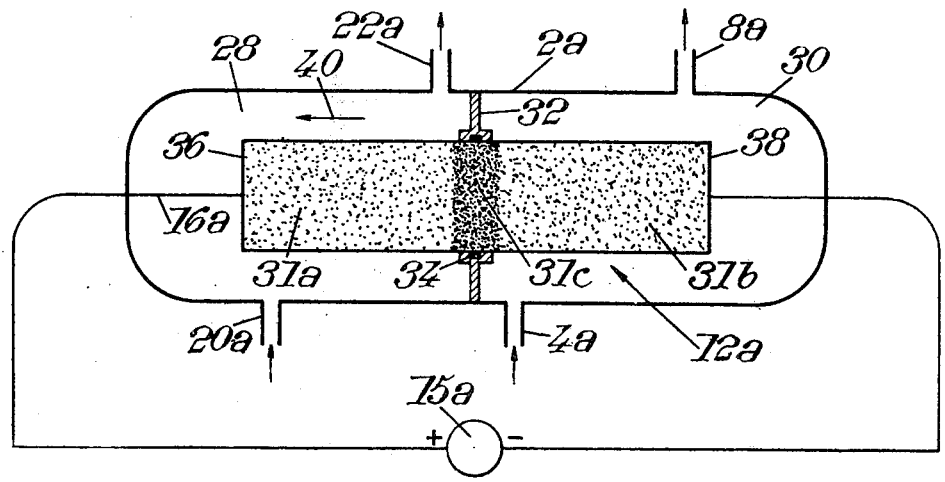
FIG. 2 is a diagrammatic view showing the essential components of an oxygen trap capable of continuous operation.

The trap just described is therefore suitable for discontinuous operation. A variation of this oxygen trap is shown in FIG. 2, this modification being capable of continuous operation. The different elements of te apparatus shown in FIG. 2 are designated by the same reference numerals, with the addition of a distinguishing letter, as the corresponding elements of the apparatus in FIG. 1. Only the distinct parts are designated by new reference numerals.

The apparatus shown in FIG. 2 differs essentially from that in FIG. 1 in that the enclave 2a is divided into two separate compartments 28 and 30, in that the block 12a comprises two parts 31a, 31b arranged in the compartments 28, 30 respectively, and in that a seal is effected between the two compartments and between the said parts 31a, 31b, without the gases which are in contact with one of the latter being able to diffuse in a gaseous state into the other part through the block 12a.

The parts 31a, 31b of the block 12a are advantageously porous and separated by a compact or solid central part 31c, the two compartments 28, 30 being separated by a partition 32 in which is provided a central opening permitting passage to the block 12a, in the central part thereof, a joint made of enamel, for example, producing the seal between the central part 31c and the edges of the opening in the partition 32.

The block 12a is inserted in an electric circuit comprising a current generator 15a whose positive terminal is connected to the end 36 and negative terminal to the end 38 of the block 12a, in the compartments 28 and 30 respectively.

The gas to be purified is admitted into the compartment 30 via the connection 4a, the purified gas being evacuated through the connection 8a, while an inert gas is introduced into the compartment 28 via a connection 20a and evacuated out of the compartment 28 by way of the connection 22a.

The traces of oxygen contained in the gas introduced into the compartment 30 are therefore retained in the corresponding part of the block 12a, in the form of $O^{2-}$ ions which migrate into the mass of the porous block, particularly in the general direction indicated by the arrow 40, when the generator is energized, these oxygen ions being converted into atoms of gaseous oxygen in the vicinity of the end 36 of the block 12a which is in contact with the conductor 16a to which it surrenders its electrons. A neutral gas introduced for scavenging purposes into the compartment 28 via the connection 20a sweeps the oxygen in gaseous form towards the evacuating pipe 22a.

An oxygen trap which can operate continuously is obtained as a result.

By way of another example, it is pointed out that it is possible to purify a gas (delivery rate, 8 liters/hour) up to partial oxygen pressures of the order of $10^{-20}$ atmospheres in approximately 20 minutes if this oxygen-containing gas has an initial content of the order of 1000 ppm,
in 70 hours for an initial content of 15 ppm,
in 600 hours for an initial content of 2 ppm,
with an apparatus such as that shown in FIG. 1 in which the block 12 comprises a 10 gram cylinder having a porosity of 30% and formed of a solid solution $(ZrO_2)$ 0.87, $(Y_2O_3)$ 0.12, $(CeO_2)$ 0.01, which is previously reduced at a temperature of 900°C by applying to its opposite ends a potential difference of between 70 and .10 Volts (constant intensity equal to 200 mA) for 30 minutes under a current of argon in order that the liberated oxygen may be removed by electrochemical reduction.

It is interesting to note that, after 4 months of continuous operation during which more than 50 oxidation-reduction cycles took place, the trap in this embodiment showed no sign of wear, its properties having remained fully reproducible since the beginning of its use.

Irrespective of the embodiment adopted, one therefore obtains an oxygen trap which has a considerable degree of effectiveness in the absence of any undesirable secondary reaction capable of causing the deterioration of either the adsorption material of the oxygen or the finally obtained purified gases.

The invention lends itself particularly to the purification of inert gasses such as nitrogen, or neutral gases such as argon, helium, etc., by the removal of traces of oxygen which they may contain, and consequently finds particularly advantageous application in the laboratory and electronics industry (manufacture of electronic components or lamps or valves in a strictly controlled atmosphere), etc.

It will also be appreciated that the activity of the materials used in the oxygen traps according to the invention is very rapid. It is moreover also possible to determine and measure the quantity of oxygen contained in a medium, if only by the quantity of oxygen absorbed in the material.

When hafnium dioxide is used instead of zirconium dioxide in the traps under consideration, traps are obtained whose operating characteristics are substantially similar to those which were indicated in the examples above.

The replacement of zirconium dioxide with thorium dioxide in the materials in question permits even purification of gas containing traces of oxygen which is even further developed than with the two aforementioned dioxides.

It is obvious as a result of the preceding description that the invention is by no means limited to those of its embodiments which have been considered in more detail; indeed it covers all modifications.

What is claimed is:

1. An electrically regenerable oxygen trap, having a closed enclave, the internal space thereof being free of oxygen or gaseous oxygen containing compounds, means for admitting into the enclave a gas containing traces of oxygen to be eliminated; means for evacuating the purified gas from the enclave, a body of material located within the enclave, and formed of a solid solution of metal oxides in a reduced state and having a strong affinity for oxygen, said solution of metal oxides being of the type which upon absorption of oxygen yields a solid solution of metal oxides, having both an ionic conductivity through $O^{2-}$ ions and a nonzero electrical conductivity.

2. A trap as claimed in claim 1, wherein said solid solution in the reduced state is derived from a solid solution which contains an electronic dope additive which imparts to the solid solution an electrical conductivity.

3. A trap as claimed in claim 2, wherein the electronic dope additive is selected from the group consisting of $La_2O_3$, $Yb_2O_3$ and $Sc_2O_3$.

4. A trap as claimed in claim 2, wherein the concentration of the solute in relation to the entire solid solution ranges from about 5 to 20%, and the concentration of electronic dope additive is about 1 to 5%.

5. A trap as claimed in claim 1, wherein said solid solution in the reduced state is derived from a solid solution which is based on zirconium dioxide, yttrium dioxide and cerium dioxide.

6. A trap as claimed in claim 5, wherein said solid solution, in the reduced state is derived from the solid solutions represented by the formula: $ZrO_2$ (86% by weight), $Y_2O_3$ (10% by weight), $CeO_2$ (4% by weight).

7. A trap as claimed in claim 5, wherein said solid solution in the reduced state is derived from the solid solution which is represented by the formula: $ZrO_2$ (90% by weight), $Y_2O_3$ (9% by weight), $CeO_2$ (1% by weight).

8. A trap as claimed in claim 1, wherein said solid solution in the reduced state is derived from a solid solution which contains at least one base oxide the metal of which is tetra valent and at least one solute formed of a metal oxide, the metal of which has a valency lower than 4.

9. A trap as claimed in claim 8, wherein the base oxide is selected from the group consisting of zirconium dioxide, thorium dioxide and hafnium dioxide and the solute is selected from the group consisting of yttrium oxide, calcium oxide, magnesium oxide and an oxide of a rare earth element.

10. A trap as claimed in claim 1, wherein the solid solution in the reduced state is derived from a solid solution which contains a base oxide formed of cerium oxide $CeO_2$ and a solute formed by at least one metal oxide selected from the group consisting of yttrium oxide $Y_2O_3$, calcium oxide $CaO$, magnesium oxide $MgO$, $La_2O_3$ and $Sc_2O_3$.

11. A trap as claimed in claim 1, wherein said solid solution in the reduced state is derived from a solid solution which is based on hafnium dioxide, yttrium dioxide and cerium dioxide.

12. A trap as claimed in claim 1, wherein said solid solution in the reduced state is derived from a solid solution which is based on thorium dioxide, yttrium dioxide, and cerium dioxide.

13. A trap as claimed in claim 1, which further comprises heating means for heating the material.

14. A trap as claimed in claim 1, wherein said body of material is porous.

15. An electrically regenerable oxygen trap having a closed enclave; a partition dividing the enclave into first and second separate compartments, a solid body extending from said first compartment into said second compartment through an opening in said partition, said body being formed of a solid solution of metal oxides in a reduced state and having a strong affinity for oxygen, said solution of metal oxides being of the type which upon absorption of oxygen yields a solid solution of metal oxides, said solid solution having both an ionic conductivity through $O^{2-}$ ions and a nonzero electrical conductivity, said body further comprising, within each of said compartments, a porous part and between said parts, a non porous part in sealed contact with the edges of said opening; means for admitting a gas to be purified into said first compartment and means for evacuating the purified gas; means for flowing an inert gas through said second compartment, and an electrical circuit comprising a generator of direct or rectified current, having a negative terminal connected to a part of the solid body contained in said first compartment and a positive terminal connected to a part of the body contained in said second compartment.

16. A trap as claimed in claim 15, wherein said solid solution in the reduced state is derived from a solid solution which contains at least one basic oxide the metal of which is tetravelent and at least one solute formed of a metal oxide, the metal of which has a valency lower than 4.

17. A trap as claimed in claim 16, wherein the base oxide is selected from the group consisting of zirconium dioxide, thorium dioxide and hafnium dioxide and the solute is selected from the group consisting of yttrium oxide, calcium oxide, magnesium oxide and an oxide of rare earth element.

18. A method for purifying a gas containing traces of oxygen in contact with a solid material having an affinity for oxygen and for regenerating this material, which comprises contacting the gas with a material comprising a solid solution of oxides in a reduced state and having a strong affinity for oxygen, said solution of metal oxides being of the type which upon absorption of oxygen reoxidizes and yields a solid solution of metal oxides and containing at least one base oxide the metal of which is tetravalent, at least one solute formed of a metal oxide the metal of which has a valency lower than 4; and, after said solid solution has been reoxidized by the oxygen trapped from the gas to be purified, flowing an inert gas free of oxygen around said solid solution and causing a direct or rectified electrical current to flow through said solid solution under a voltage sufficient to cause a release of oxygen by said solid solution, the freed oxygen being removed by the flow of inert gas, and interrupting the flow of electrical current, whereby a solid solution in the reduced state is obtained, which is ready to trap oxygen again from a gas containing traces of oxygen.

19. A method as claimed in claim 18, wherein the base oxide is selected from the group consisting of zirconium, thorium and hafnium dioxides, and the solute is selected from the group consisting of yttrium oxide $Y_2O_3$, calcium oxide $CaO$, magnesium oxide $MgO$, and an oxide of a rare earth element.

20. A method as claimed in claim 19, wherein said solid solution further contains an electronic dope additive, selected from the group consisting of cerium oxide $CeO_2$ and an oxide of a transition metal.

21. A method according to claim 18, which comprises detecting the complete reoxidation of the solid solution initially in the reduced state, by means either of color change or conductivity change of said solid solution.

22. A method as claimed in claim 18, wherein the base oxide is formed of $CeO_2$ and the solute is formed by at least one metal oxide selected from the group consisting of $Y_2O_3$, $CaO$, $MgO$, $La_2O_3$, $Yb_2O_3$ and $Sc_2O_3$.

23. A method as claimed in claim 18, wherein said solid solution is based on $ZrO_2$, $Y_2O_3$ and $CeO_2$.

24. A method as claimed in claim 18, wherein the concentration of the solute in relation to the entire solid solution ranges from 5 to 20%.

25. A method for the purification of an inert gas containing traces of oxygen, which comprises contacting the gas with a first part of a solid solution of oxides in a reduced state and having a strong affinity for oxygen, said solution of metal oxides being of the type which upon absorption of oxygen yields a solid solution of metal oxides and containing at least one base oxide the metal of which has a valence of 4, a solute formed of at least one metal oxide the metal of which has a valency lower than 4, wherein the solid solution is in the form of a block, and contacting a second part of said solid solution with an inert gas flow, without the gas which is in contact with one of these parts being able to diffuse in a gaseous form from one of said parts to the other, through the block, inclusive, and applying between these two parts a voltage sufficient to keep the solid solution in the reduced state and to remove the traces of oxygen absorbed from the gases to be purified in said first part through and from said second part of the block by maintaining said first part electrically negative relative to said second part.

26. A method as claimed in claim 25, wherein said solid solution is maintained at a temperature at which it exhibits both ionic and electrical conductivity.

27. A method as claimed in claim 25, characterized in that the base oxide is selected from the group consisting of zirconium, thorium and hafnium dioxides, the solute is selected from the group consisting of yttrium oxide $Y_2O_3$, calcium oxide CaO, magnesium oxide MgO, and an oxide of a rare earth element, and said solid solution further containing an electronic dope additive selected from the group consisting of cerium oxide $CeO_2$ and an oxide of a transition metal.

28. A method as claimed in claim 25, wherein the base oxide is formed of $CeO_2$ and the solute is formed by at least one metal oxide selected from the group consisting of $YrO_3$, CaO, MgO, $La_2O_3$, $Yb_2O_3$ and $Sc_2O_3$.

29. A method as claimed in claim 25, wherein said solid solution is based on $ZrO_2$, $Y_2O_3$ and $CeO_2$.

30. A method as claimed in claim 25, wherein the concentration of the solute in relation to the entire solid solution ranges from 5 to 20%.

* * * * *